(12) United States Patent
Diochon et al.

(10) Patent No.: US 7,784,733 B2
(45) Date of Patent: Aug. 31, 2010

(54) TURBOJET PYLON FOR AIRCRAFT

(75) Inventors: Lionel Diochon, Toulouse (FR); Jerome Durand, Leguevin (FR)

(73) Assignee: Airbus France, Toulouse (FR)

( * ) Notice: Subject to any disclaimer, the term of this patent is extended or adjusted under 35 U.S.C. 154(b) by 261 days.

(21) Appl. No.: 11/632,077

(22) PCT Filed: Aug. 3, 2005

(86) PCT No.: PCT/FR2005/050645

§ 371 (c)(1),
(2), (4) Date: Jan. 10, 2007

(87) PCT Pub. No.: WO2006/090032

PCT Pub. Date: Aug. 31, 2006

(65) Prior Publication Data

US 2007/0205324 A1    Sep. 6, 2007

(30) Foreign Application Priority Data

Aug. 5, 2004  (FR)  .................................. 04 51791

(51) Int. Cl.
  *B64D 27/26*  (2006.01)
  *B64D 27/00*  (2006.01)
(52) U.S. Cl. ...................................................... 244/54

(58) Field of Classification Search ................... 244/54, 244/55, 53 R; 248/554
See application file for complete search history.

(56) References Cited

U.S. PATENT DOCUMENTS

| 3,666,211 | A |   | 5/1972  | Cathers et al. |
| 3,848,832 | A |   | 11/1974 | Stanley et al. |
| 4,266,741 | A | * | 5/1981  | Murphy ........................ 244/54 |
| 6,126,110 | A | * | 10/2000 | Seaquist et al. ............... 244/54 |

OTHER PUBLICATIONS

U.S. Appl. No. 11/572,213, filed Jan. 17, 2007, Diochon, et al.
U.S. Appl. No. 11/572,003, filed Jan. 12, 2007, Diochon, et al.
U.S. Appl. No. 11/571,666, filed Jan. 5, 2007, Diochon, et al.

* cited by examiner

*Primary Examiner*—Tien Dinh
*Assistant Examiner*—Richard R Green
(74) *Attorney, Agent, or Firm*—Oblon, Spivak, McClelland, Maier & Neustadt, L.L.P.

(57) ABSTRACT

A turbojet-mounting pylon for an aircraft. The pylon includes a rigid structure including a plurality of arcs arranged so as to jointly delimit a part of a fictitious approximately cylindrical surface with a circular section. The plurality of arcs also includes two lateral thrust resisting arcs located on each side of the central box, each of the two lateral arcs being fixed to each arc in the form of an annular portion, and on each side of the central box.

14 Claims, 8 Drawing Sheets

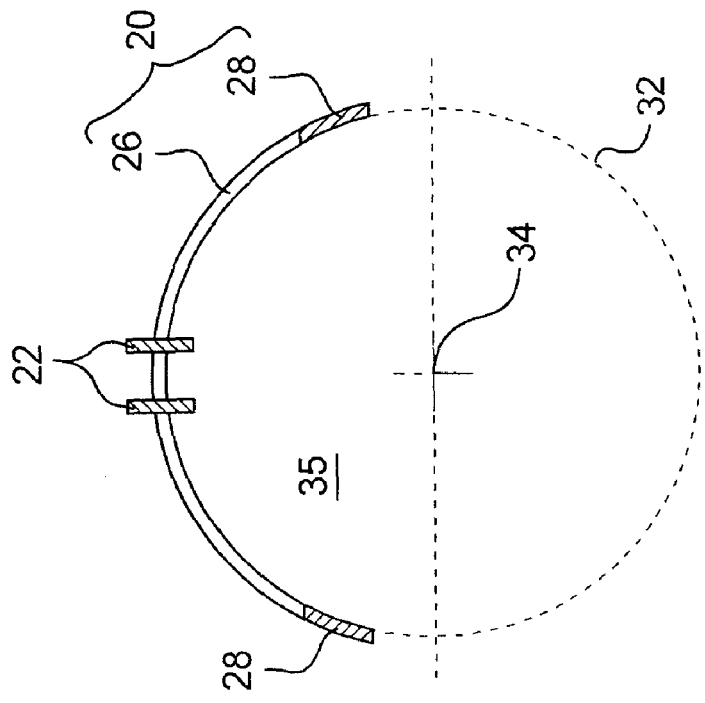
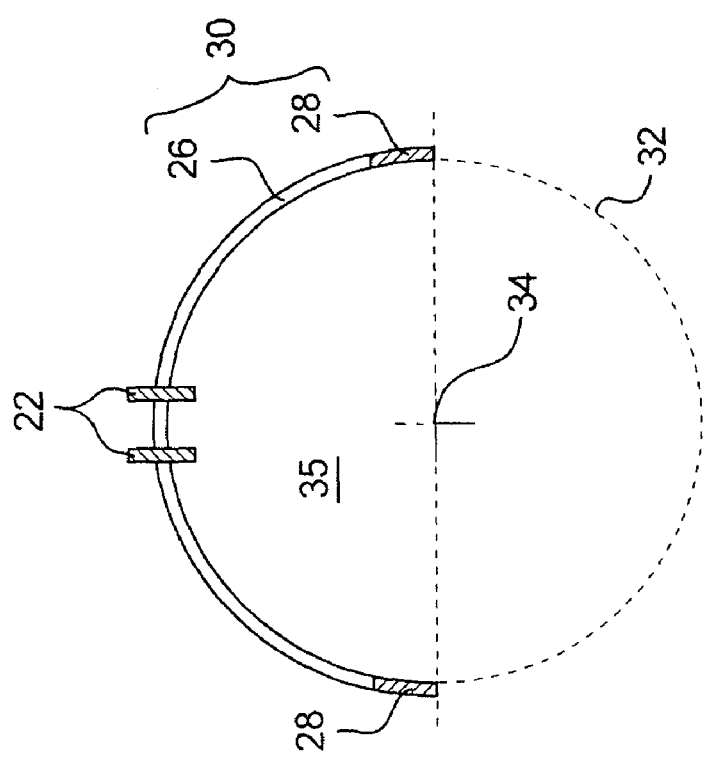

TURBOJET PYLON FOR AIRCRAFT

TECHNICAL DOMAIN

This invention relates in general to a turbojet mounting pylon for an aircraft. This type of mounting pylon is also called an EMS (Engine Mounting Structure), that can be used to suspend the turbojet below the aircraft wing, or to fit this turbojet above the same wing.

STATE OF PRIOR ART

Such a mounting pylon is designed to form the connecting interface between a turbojet and a wing of the aircraft. It transmits forces generated by its associated turbojet to the structure of this aircraft, and it also enables routing of fuel, electricity, hydraulics and air between the engine and the aircraft.

In order to transmit forces, the pylon comprises a rigid structure, frequently of the "box" type, in other words formed by the assembly of upper and lower spars and side panels connected to each other through transverse ribs.

The pylon is also provided with an engine mounting system inserted between the turbojet and the rigid structure of the pylon, this system globally including at least two engine fasteners, usually a forward fastener and an aft fastener.

The mounting system also includes a device for resisting thrusts generated by the turbojet. For example in prior art, this device is in the form of two lateral connecting rods connected firstly to an aft part of the turbojet fan casing, and secondly to an aft fastener attached to the central casing of the turbojet.

Similarly, the mounting pylon also comprises a second mounting system inserted between the rigid structure of this pylon and the aircraft wing, this second system typically being composed of two or three fasteners.

Finally, the pylon is provided with a secondary structure segregating-and maintaining systems in place, while supporting aerodynamic fairings.

As described above, a conventional mounting pylon according to prior art is generally in the form of a parallelepiped-shaped box with large dimensions to resist all forces generated by the associated turbojet.

Furthermore, all previously proposed solutions specify that at least one aft fastener should be fixed onto the central casing of the turbojet, therefore the mounting pylon is designed to be positioned close to this central casing, obviously so that the aft fastener can be suitably assembled.

Thus, in this specific case in which the large box shaped mounting pylon is arranged close to the central casing of the turbojet, this pylon inevitably creates strong disturbances-of the secondary flow escaping from the annular fan duct, which results directly in losses in terms of drag, turbojet efficiency and fuel consumption. Furthermore, these disturbances are naturally accentuated by the presence of thrust resisting rods arranged at the output from the annular fan duct.

OBJECT OF THE INVENTION

Therefore, the purpose of the invention is to propose a mounting pylon for an aircraft turbojet at least partially overcoming the disadvantages mentioned above related to embodiments according to prior art, and also to present an aircraft with at least one such pylon.

To achieve this, the object of the invention is a turbojet mounting pylon for an aircraft with a rigid structure comprising a plurality of arcs arranged so as to jointly delimit a part of a fictitious approximately cylindrical surface with a circular section, the plurality of arcs comprising at least one arc in the form of an annular portion approximately centered on a longitudinal axis of the fictitious surface. According to the invention, the rigid structure of the mounting pylon comprises a central box, also called the central torsion box, that extends parallel to the longitudinal axis of the fictitious surface and that is fixed to each arc in the form of an annular portion. Furthermore, the plurality of arcs also comprises two lateral thrust resisting arcs located on each side of the central box, each of the two lateral arcs being fixed firstly to each arc in the form of an annular portion, and on each side of the central box.

Thus, the curvature of each of the arcs among the plurality of arcs is such that it extends around this fictitious approximately cylindrical shaped surface with a circular section. Consequently, they jointly form an assembly of the rigid structure that is advantageously capable of only slightly disturbing the secondary flow escaping from the annular fan duct of the turbojet associated with it, compared with conventional solutions according to prior art in which the mounting pylon was in the form of a central parallelepiped shaped box with large dimensions arranged very close to the central casing of the turbojet.

It is actually possible to arrange for a diameter of the fictitious surface to be approximately identical to a diameter of an external cylindrical surface of the fan casing of the associated turbojet, implying that the rigid assembly formed by the plurality of arcs is then approximately along the extension to this external surface of the fan casing, and more generally along the extension of a peripheral annular part of this casing. Naturally, in this special case in which the plurality of arcs can be compared with a portion of an approximately cylindrical envelope with a circular section and with a diameter similar to the diameter of the fan casing, the disturbances in the secondary flow that can be caused by this plurality of arcs are extremely small, or practically non-existent.

This then has the advantage of providing improvements in drag, turbojet efficiency and fuel consumption.

For information, note that although the plurality of arcs can generally be compared with a portion of an approximately cylindrical envelope with a circular section, it is preferably in the form of an approximately cylindrical envelope with a semi-circular section, the concept of "portion" obviously being present due to the empty spaces between the different arcs. Naturally, this preferred form is quite suitable to facilitate assembly of the turbojet on the rigid structure of the mounting pylon.

As mentioned above, the plurality of arcs comprises at least one arc in the form of an annular portion approximately centered on a longitudinal axis of the fictitious surface, this longitudinal axis being parallel to the longitudinal direction of the pylon, and preferably designed to be coincident with the longitudinal axis of the turbojet. As an illustrative example, all above mentioned engine fasteners can be fixed onto such an arc in the form of an annular portion.

Furthermore, the mechanical strength provided by the arcs enables the central box to have smaller dimensions than were used in the past, mainly for its thickness. This means that this central box is also capable of only causing very small disturbances to the secondary flow output from the annular fan duct. Furthermore, note that the central box can be thin due to the fact that there are no plans to insert an aft engine fastener between this same box and the turbojet central casing, and consequently there is no longer any need to bring the box as close as possible to this casing as was done in the past.

Finally, note that thrusts generated by the turbojet are then advantageously resisted using elements forming an integral part of the rigid structure of the mounting pylon. Thus, there is no longer any need to provide an additional thrust resisting device of the type with lateral rods, as was the case for known solutions according to prior art.

In this case, and still in order to resist thrust, the plurality of arcs may also include two lateral secondary thrust resisting arcs arranged on each side of the central box, each of these two secondary lateral arcs being fixed firstly to at least one arc in the form of an annular portion, and secondly to the central box.

Furthermore, the plurality of arcs may also include two lateral thrust resisting support arcs, these two support arcs being arranged on each side of the central box and each fixed firstly to one of the two lateral arcs and secondly to the central box. Advantageously, the support arcs are arranged so as to be stressed in tension, and prevent deflection of the lateral thrust resisting arcs.

Preferably, the mounting pylon comprises a plurality of engine fasteners, each being fixed to the plurality of arcs. Thus, it should be understood that these engine fasteners on the mounting pylon are all designed to be fixed to the fan casing of the turbojet cooperating with this pylon.

In such a case, thrusts generated by the turbojet are resisted exclusively on the fan casing through all engine fasteners, and consequently this enables the central casing of this turbojet to be no longer connected directly to the mounting pylon by one or several aft fastener(s), as was the case in embodiments according to prior art.

Thus, this particular arrangement of engine fasteners on the rigid structure of the pylon is capable of inducing a considerable reduction in the bending encountered at the central casing, regardless of whether this bending is due to thrusts generated by the turbojet, or due to gusts that may be encountered during the various flight phases of the aircraft.

Consequently, the above mentioned reduction in bending generates a significant reduction in friction between rotating compressor and turbine blades and the engine central casing, and therefore significantly reduces losses of efficiency due to wear of these blades.

Furthermore, the fact that engine fasteners are provided on the plurality of arcs makes it possible to significantly separate them from each other, for example the resulting separation being approximately equal to the diameter of the fictitious surface which is much larger than a width of the central box. This large separation has the advantage that it can very much simplify the design of these engine fasteners, due to the fact that the forces that it must resist, associated with a moment about a given axis, are naturally lower than the values encountered in classical solutions according to prior art in which the engine fasteners designed to be fixed on the central casing could not be as far away from each other.

It is also indicated that the engine fasteners and the rigid structure of the mounting pylon may advantageously be located at a distance from the hot part of the associated turbojet, which means that thermal effects acting on these elements can be significantly reduced.

Preferably, the plurality of engine fasteners consists of a first engine fastener and a second engine fastener located symmetrically about a plane defined by the longitudinal axis of the fictitious surface and a vertical direction of the pylon, and a third engine fastener through which this same plane passes.

In this configuration, it will be possible for the first, second and third engine fasteners to be fixed on the same arc in the form of an annular portion belonging to the plurality of arcs, which means that they can occupy positions in which they are advantageously at a distance from each other. Being located on the same arc in the form of an annular portion, the engine fasteners can thus easily be fixed to the peripheral annular part of the fan casing.

Preferably, a plane defined by the longitudinal axis of the fictitious surface and a transverse direction of the mounting pylon pass through the first and second engine fasteners.

Also preferably, the first and second engine fasteners are each designed so as to resist forces applied along a longitudinal direction of the pylon and along the vertical direction of the pylon, and the third engine fastener is designed so as to resist forces applied along this same longitudinal direction of the pylon, and along a transverse direction of the pylon.

Another purpose of the invention is an aircraft with, at least one mounting pylon like the mounting pylon that has just been described.

Other advantages and characteristics of the invention will become clearer from the non-limitative detailed description given below.

BRIEF DESCRIPTION OF THE FIGURES

This description will be made with reference to the appended Figures, wherein:

FIGS. 4a and 4b respectively show section views taken in the transverse planes P1 and P2 respectively as shown in FIG. 3;

DETAILED DESCRIPTION OF PREFERRED EMBODIMENTS

Figure 1:
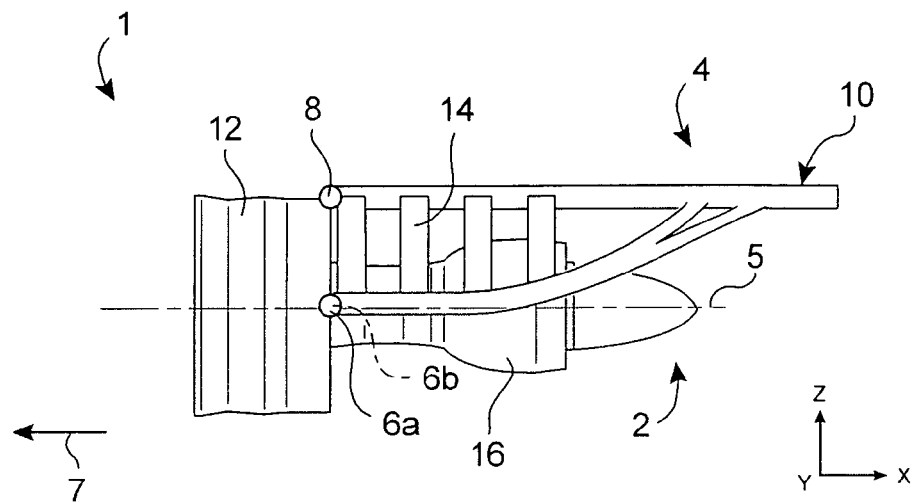
FIG. 1 shows a side view of an engine assembly for an aircraft comprising a mounting pylon according to one preferred embodiment of this invention.

FIG. 1 shows an engine assembly 1 for an aircraft designed to be fixed under a wing of this aircraft (not shown), this assembly 1 according to one preferred embodiment of this invention comprising a mounting pylon 4.

Globally, the engine assembly 1 is composed of a turbojet 2 and the mounting pylon 4, the mounting pylon being provided in particular with a plurality of engine fasteners 6a, 6b, 8, and a rigid structure 10 carrying these same fasteners (fastener 6b in this FIG. 1 being hidden by fastener 6a). For guidance, note that the assembly 1 will be surrounded by a pod (not shown), and the mounting pylon 4 comprises another series of fasteners (not shown) to suspend this assembly 1 under the aircraft wing.

Throughout the following description, the convention used is that X is the longitudinal direction of the pylon 4 and is also effectively the longitudinal direction of the turbojet 2, this direction X being parallel to a longitudinal axis 5 of this turbojet 2. Secondly, the Y direction is the direction transverse to the pylon 4 and that can also be considered to be the transverse direction of the turbojet 2, and Z is the vertical direction or the height direction, these three directions X, Y and Z being orthogonal to each other.

Furthermore, the terms <<forward>> and <<aft>> should be considered with respect to a direction of movement of the aircraft that occurs as a result of the thrust applied by the turbojet 2, this direction being shown diagrammatically by the arrow 7.

In FIG. 1, it can be seen that only the engine fasteners 6a, 6b, 8 and the rigid structure 10 of the mounting pylon 4 are shown. The other components of this pylon 4 that are not shown, such as the mounting means of the rigid structure 10 under the aircraft wing, or the secondary structure for segregation and maintenance of systems while supporting aerodynamic fairings, are conventional elements identical to or similar to those encountered in prior art and known to those skilled in the art. Consequently, no detailed description of them will be made.

Furthermore, the turbojet 2 is provided with a large fan casing 12 at the forward end delimiting an annular fan duct 14 and comprises a smaller central casing 16 towards the aft and containing the core of this turbojet. Casings 12 and 16 are obviously fixed to each other.

As can be seen in FIG. 1, the engine fasteners 6a, 6b, 8 of the pylon 4 (there are preferably three of them) are all fixed on the above-mentioned fan casing 12.

Figure 2:
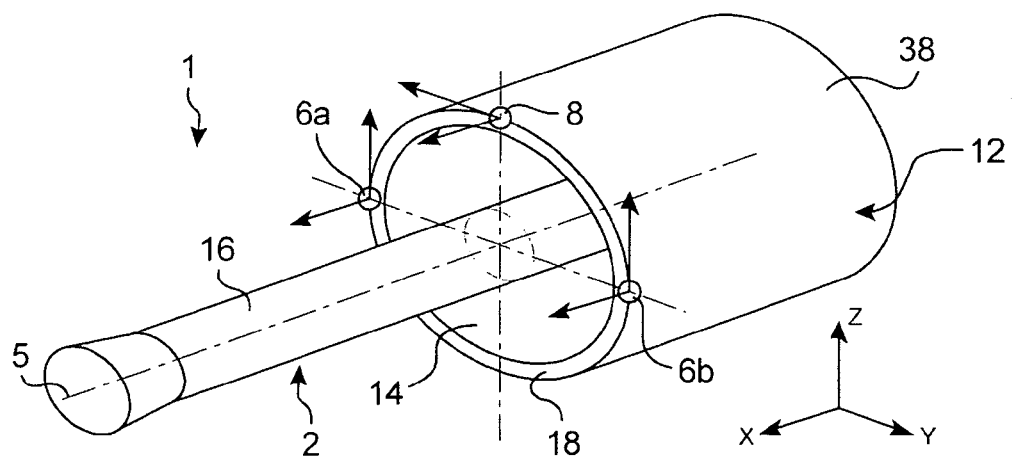
FIG. 2 shows a diagrammatic perspective view of the assembly shown in FIG. 1, the rigid structure of the mounting pylon having been removed to more clearly show the engine fasteners for this same pylon.

With reference now to FIG. 2 more specifically and diagrammatically showing these same engine fasteners 6a, 6b, 8, it can be seen that the first fastener 6a and the second fastener 6b are arranged symmetrically about a first plane (not shown) defined by the longitudinal axis 5 and the direction Z.

More precisely, the fasteners 6a, 6b are both fixed on a peripheral annular part 18 of the fan casing 12, and preferably on the back of this part 18 as shown diagrammatically.

It would then be possible for the first and second engine fasteners 6a, 6b to be diametrically opposed on the peripheral annular part 18 presenting an outer cylindrical surface 38 of the fan casing 12, such that a second plane defined by the longitudinal axis 5 and the Y direction of the pylon 4 passes through these fasteners 6a, 6b.

As shown diagrammatically by the arrows in FIG. 2, each of the first and second engine fasteners 6a, 6b is designed so that it can resist forces generated by the turbojet 2 along the X direction and along the Z direction, but not forces applied along the Y direction.

In this way, the two fasteners 6a, 6b are well separated from each other and jointly resist the moment applied along the X direction, and the moment applied along the Z direction.

Still with reference to FIG. 2, it can be seen that the third engine fastener 8 represented diagrammatically is also fixed on the peripheral annular part 18 of the fan casing 12, also preferably on the back of this part 18.

For guidance, note that the fasteners 6a, 6b, 8 are fixed on the peripheral annular part 18 of the casing 12 through structural parts (not shown) of the engine that are effectively preferably arranged on the back of the peripheral annular part 18. Nevertheless, it is also possible to encounter engines for which the structural parts are located further forward on the peripheral annular part 18, implying that the fasteners 6a, 6b, 8 are also fixed further forward on the engine, always on the peripheral annular part 18 of the fan casing 12.

The third fastener 8 is located on the highest part of the fan casing 12, and therefore on the highest part of the peripheral annular part 18, and consequently the first plane mentioned above passes through it fictitiously.

As shown diagrammatically by the arrows in FIG. 2, the third engine fastener 8 is designed so that it can resist forces generated by the turbojet 2 along the X direction and along the Y direction, but not forces applied along the Z direction.

In this way, this third fastener 8 and the two fasteners 6a, 6b jointly resist the moment applied along the Y direction.

Note that although the engine fasteners 6a, 6b, 8 of the pylon 4 are shown diagrammatically in FIGS. 1 and 2, it should be understood that these fasteners can be made using any form known to those skilled in the art, for example such as a method involving the assembly of shackles and fittings.

As was mentioned above, the main advantage associated with the configuration that has just been described is related to the fact that complete freedom of the central casing 16 with regard to engine fasteners 6a, 6b, 8 very much reduces bending of this casing during the different flight situations of the aircraft, and therefore significantly reduces wear by friction of blades in the compressor and turbine adjacent to this central casing 16.

Figure 3:
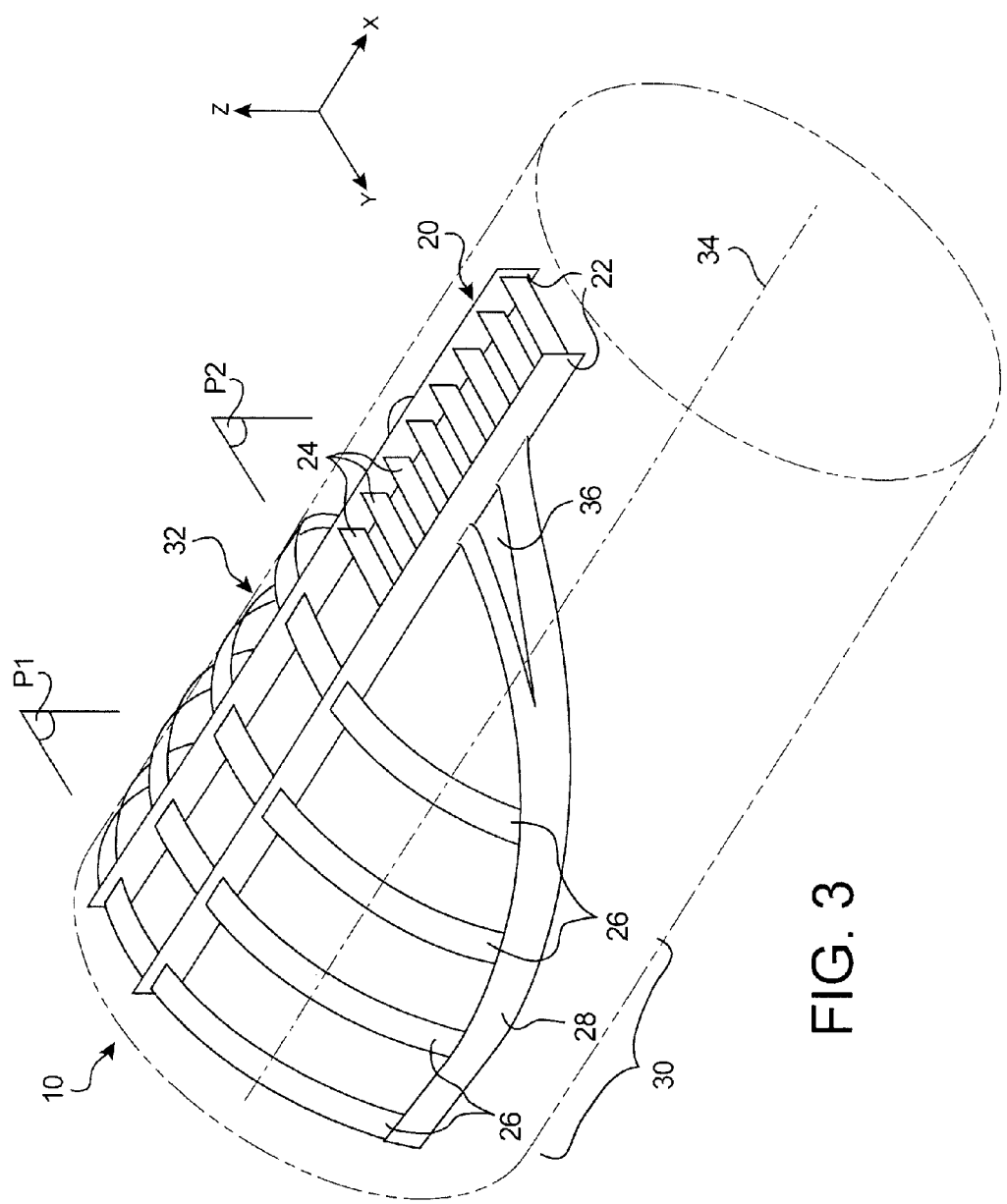
FIG. 3 shows a partial and enlarged perspective view of the mounting pylon according to the preferred embodiment.

With reference now to FIG. 3, the rigid structure 10 of the mounting pylon 4 according to this invention is shown in detail, the engine fasteners 6a, 6b, 8 having been deliberately omitted in this Figure.

Firstly, note that this rigid structure 10 is designed to be symmetric about the first plane indicated above, in other words about the vertical plane defined by the longitudinal axis 5 of the turbojet 2, and the Z direction.

This rigid structure 10 comprises a central torsion box 20 that extends from one end of the structure 10 to the other in the X direction parallel to this direction. For guidance, this box 20 may be formed by the assembly of two lateral spars 22 extending along the X direction in the parallel XZ planes, and connected to each other by transverse ribs 24 that are oriented in parallel YZ planes.

A plurality of arcs 30 is designed to complete the rigid structure 10 for which the central box 20 is located at an upper portion of this same structure 10, each of the arcs being fixed to the central torsion box 20 and projecting on each side of it along the Y direction.

The special feature of this plurality of arcs 30 is that it delimits part of a fictitious approximately cylindrical surface 32 with a circular section and a longitudinal axis 34 parallel to the central box 20, as shown in FIG. 3. In other words, the arcs 26, 28 forming the plurality of arcs 30 each have an adapted curvature so that they can be positioned around and in contact with the fictitious surface 32, over their entire length. Thus, in general, the plurality of arcs 30 forms a portion of an approximately cylindrical envelope/cage with a circular section that can be positioned around and at a distance from the central casing 16 of the turbojet 2.

Among the plurality of arcs 30, note firstly the presence of several arcs in the form of an annular portion 26 that are centered approximately on the longitudinal axis 34 of the fictitious surface 32, this axis preferably being coincident with the longitudinal axis 5 of the turboprop 2. Consequently, it can be seen that the rigid structure 12 is also symmetrical about the vertical plane defined by the longitudinal axis 34 and the Z direction of the pylon 4.

Therefore, the arcs 26 are at a spacing from each other along the X direction and are arranged in parallel YZ planes.

They are also fixed to the central box 20 that passes through each of them at the mid-point. More precisely, each arc in the form of an annular portion 26 passes through the two lateral spars 22 and is rigidly fixed onto them, for example by welding or by mechanical assembly.

For guidance, these arcs 26 may each be made in a single piece, or for example using two identical parts rigidly connected to each other.

In the embodiment shown in FIG. 3, there are four of the arcs 26 and their length reduces as they approach the aft part of the structure 10. Note that the arc 26 located further forwards from the structure 10 and fixed to a forward end of the central box 20, is in the form of a half ring, the two ends of which are consequently arranged in the XY plane passing through the longitudinal axis 34, this plane being identical to the second plane mentioned above, still due to the fact that the axes 5 and 34 are coincident. The second arc 26 is slightly longer than the length of a half ring, and so on until the last arc 26 for example located at a central portion of the box 20, considered along the X direction.

Note that the forward part of the central box 20 through which the arcs in the form of an annular portion 26 do not necessitate integration of transverse ribs 24, because the two lateral spars 22 are connected to each other through the top part of these arcs 26.

The plurality of arcs 30 also comprises two lateral thrust-resisting arcs 28 (only one being shown in FIG. 3, due to the perspective view). These arcs 28 are actually arranged so that they can resist thrusts generated by the turbojet 2 during the different aircraft flight phases, obviously in order to limit longitudinal bending of this turbojet 2, and more precisely of its fan casing 12.

An arc 28 is arranged on each side of the central box 20 and has a front part rigidly connected to the arcs 26, and an aft part rigidly connected to the central box 20. More precisely, each of the two arcs 28 has a forward end fixed to one of the two ends of the forwardmost arc 26 and extends in the aft direction and upwards, being rigidly connected to one of the two ends of each of the other arcs 26. Its aft end is then assembled onto the lateral spar 22 located on the same side as the arc 28 concerned, at an aft part of the box 20. It should be observed that a stiffener 36 could possibly be added to reinforce the mechanical bond set up between the aft end of the arc 28 and the associated lateral spar 22, this link for example being obtained by welding or by mechanical assembly.

FIG. 4a shows a sectional view taken on a transverse plane P1 located between the two forward most arcs 26, and FIG. 4b shows a sectional view taken along another transverse plane P2, located behind the arc 26 furthest in the aft direction, but forwards from the junction between the arc 28 and the central box 20.

In these Figures, it can be seen that the plurality of arcs 30 delimits part of the approximately cylindrical fictitious surface 32 with a circular section, and this plurality of arcs 30 actually forms a portion of an approximately cylindrical envelope/cage with a semi-circular section centered on the longitudinal axis 34, as will also be described with reference to FIG. 4c.

Note that to create the least possible disturbance in the secondary flow output from the annular fan duct 14, the diameter of the fictitious cylindrical surface 32 is preferably approximately the same as the diameter of the outside cylindrical surface 38 of the annular part 18 of the fan casing 12. Furthermore, as can be seen in FIGS. 4a and 4b, the lateral spars 22 only project over a very small distance inside the space 35 delimited by the fictitious surface 32, such that they no longer very significantly disturb the secondary air flow.

This is explained particularly because the height of the spars 22 along the Z direction is extremely small compared with the diameter of the fictitious surface 32 and the outside surface 38. Furthermore, only a lower part of these spars 22 penetrates inside the space 35, the other part being located above the plurality of arcs 30.

Figure 4C:
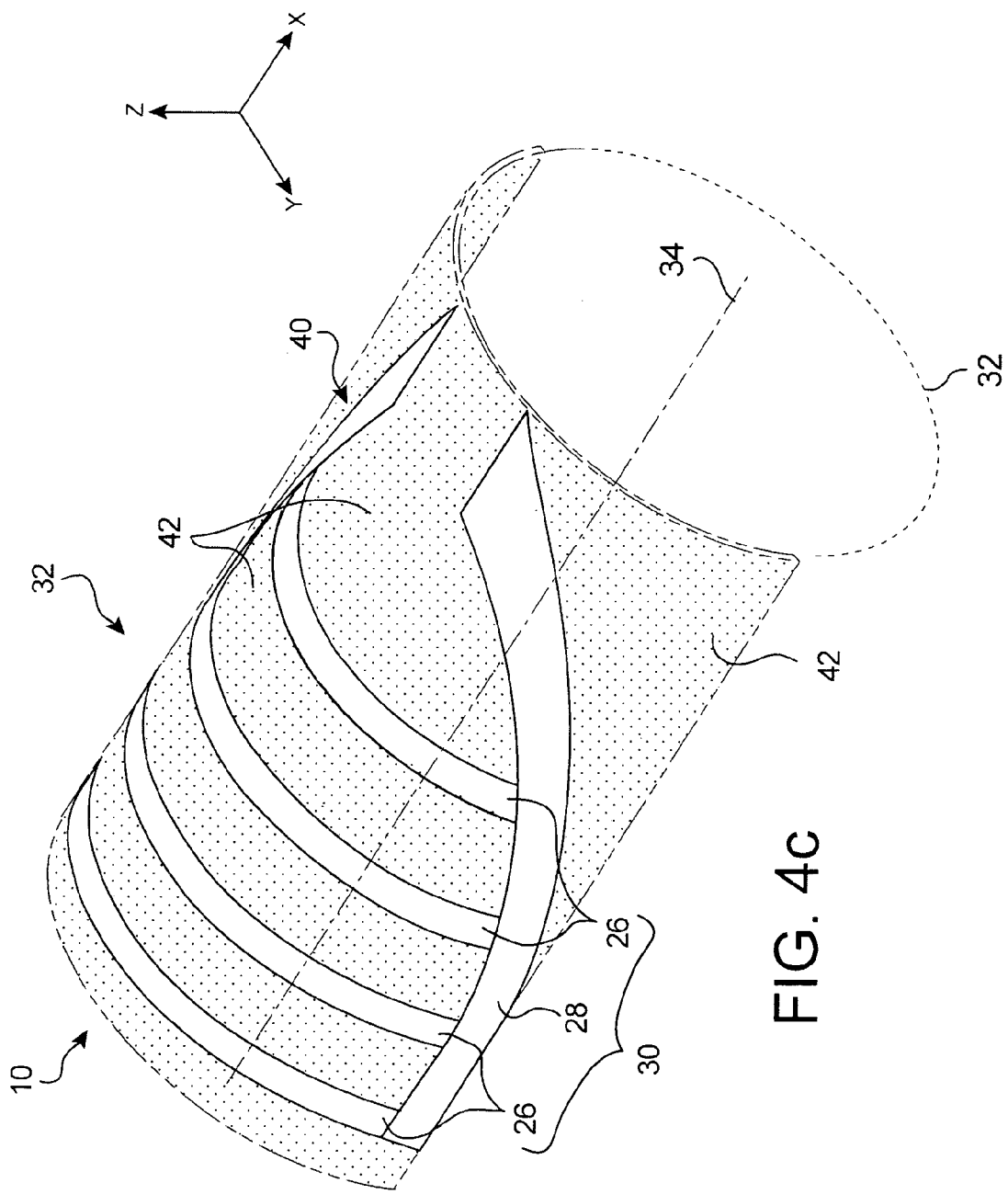
FIG. 4c shows a perspective view that will explain the shape of the plurality of arcs designed to partially form the mounting pylon in FIG. 3.

To diagrammatically illustrate the preferred form of the plurality of arcs 30, FIG. 4c shows that this form constitutes only part of an approximately cylindrical envelope/cage 40 with a semi-circular section, centered on the longitudinal axis 34 and surrounding the upper half of the fictitious surface 32. Thus, in this FIG. 4c, the parts 42 shown cross-hatched correspond to missing parts in the plurality of arcs 30 to form the complete half cylinder 40. Furthermore, this representation also demonstrates that the plurality of arcs 30 approximately form an extension of the peripheral annular part 18 of the fan casing 12 towards the aft direction.

Figure 5:
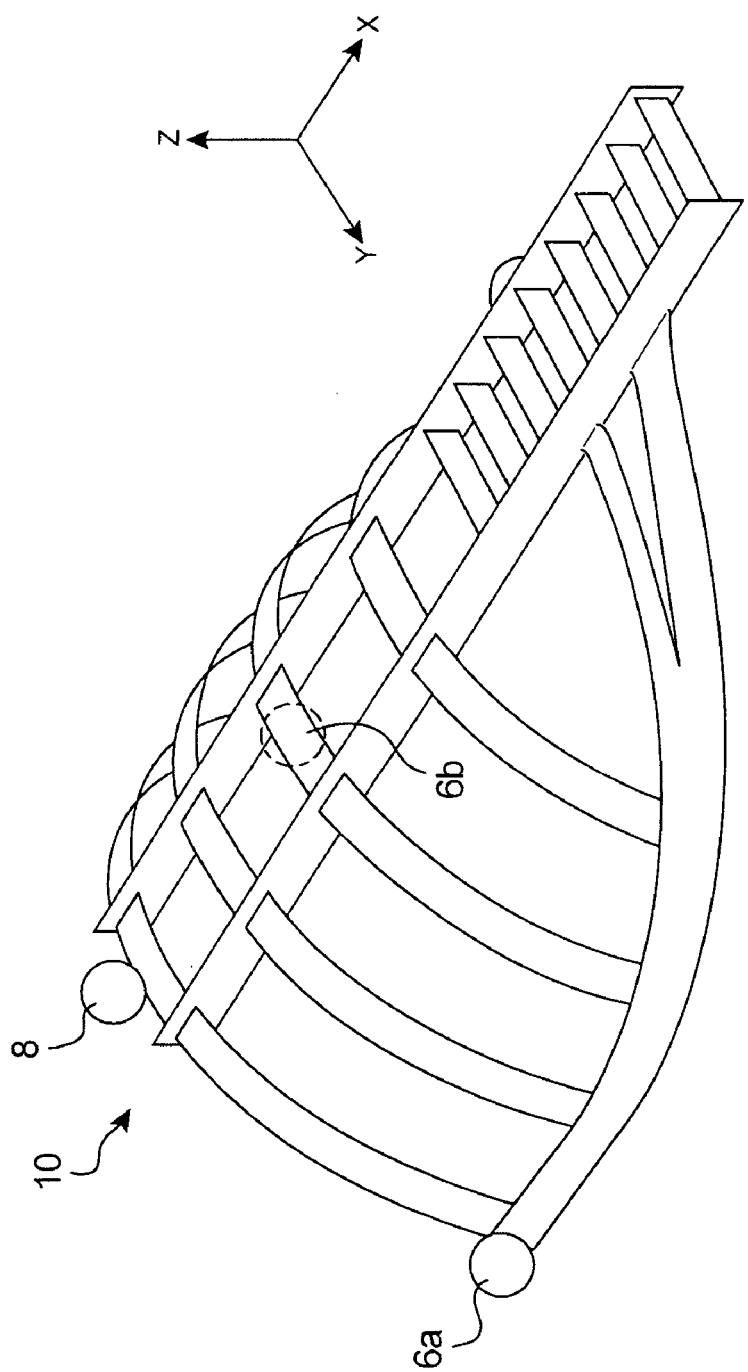
FIG. 5 shows a view similar to that shown in FIG. 3, to which a diagrammatic representation of engine fasteners of the mounting pylon is added.

FIG. 5 shows that the rigid structure 10 of the mounting pylon 4 is quite suitable for resisting engine fasteners 6a, 6b, 8, because they can easily be fixed onto the forward most arc 26. The first and second fasteners 6a, 6b are fixed to the two forward most ends of this arc 26 in the form of a half ring, while the third fastener 8 is fixed to the upper part of this same arc 26, located between the two lateral spars 22 of the central box 20. Furthermore, in the case selected in which the central box 20 is provided with an upper horizontal spar and a lower horizontal spar (not shown for reasons of clarity) closing off this box 20 towards the top and towards the bottom respectively, the third fastener 8 is then also located between these two horizontal spars of the central box 20.

Therefore, it should be understood that the two engine fasteners 6a, 6b are arranged symmetrically about the plane defined by the longitudinal axis 34 and the Z direction of the pylon 4, similarly this plane identical to the first plane mentioned above passes through the third engine fastener 8.

For guidance, all of the elements making up the rigid structure 10 that has just been described can be made using metallic materials such as steel, aluminum or titanium, or using composite materials, preferably made of carbon. Furthermore, each of the arcs in the plurality of arcs 30 may be in the form of a curved strip of metal plate.

Figure 6:
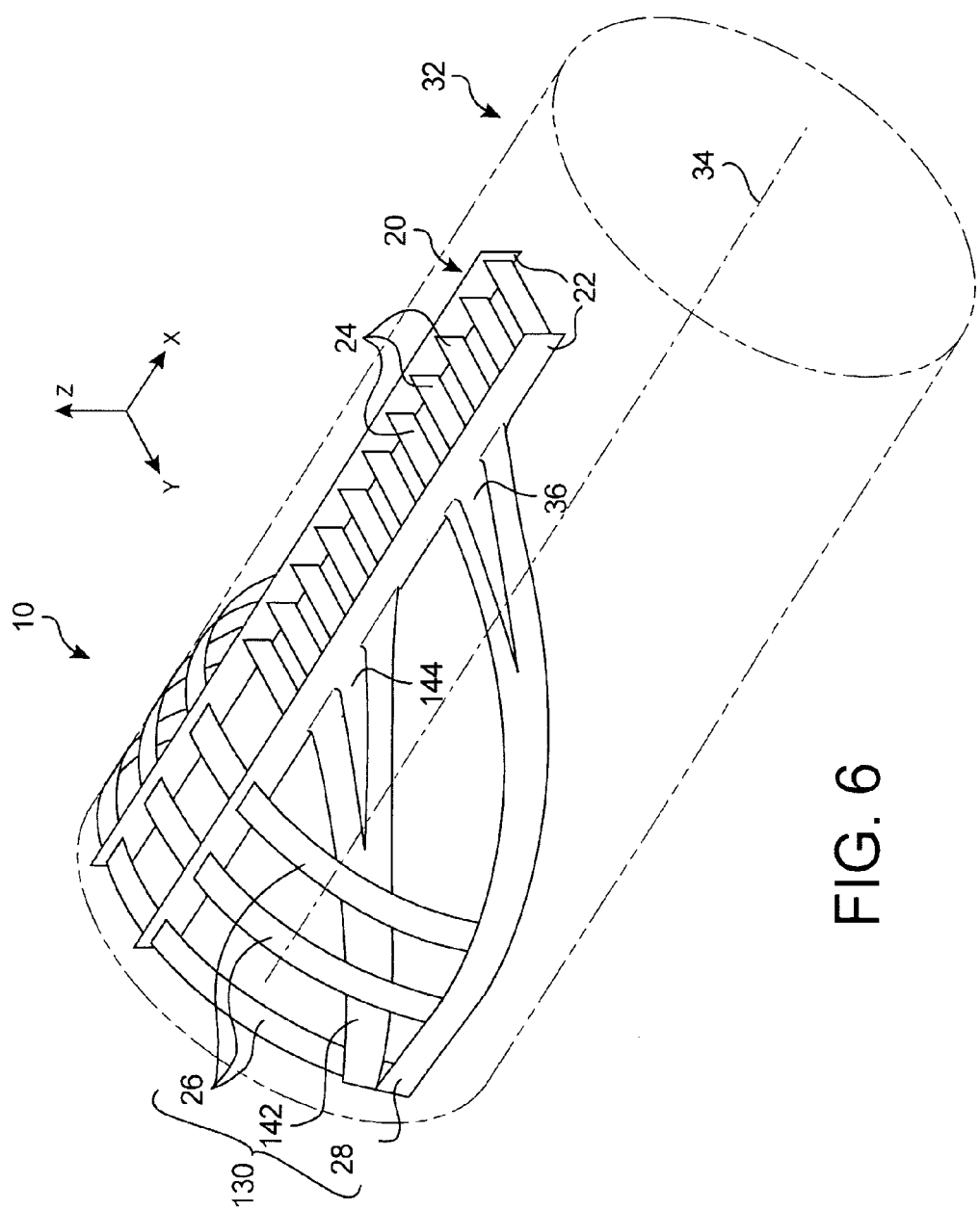
FIG. 6 shows a view similar to that shown in FIG. 3, in which the mounting pylon is in the form of a first alternative to the preferred embodiment.
Figure 7:
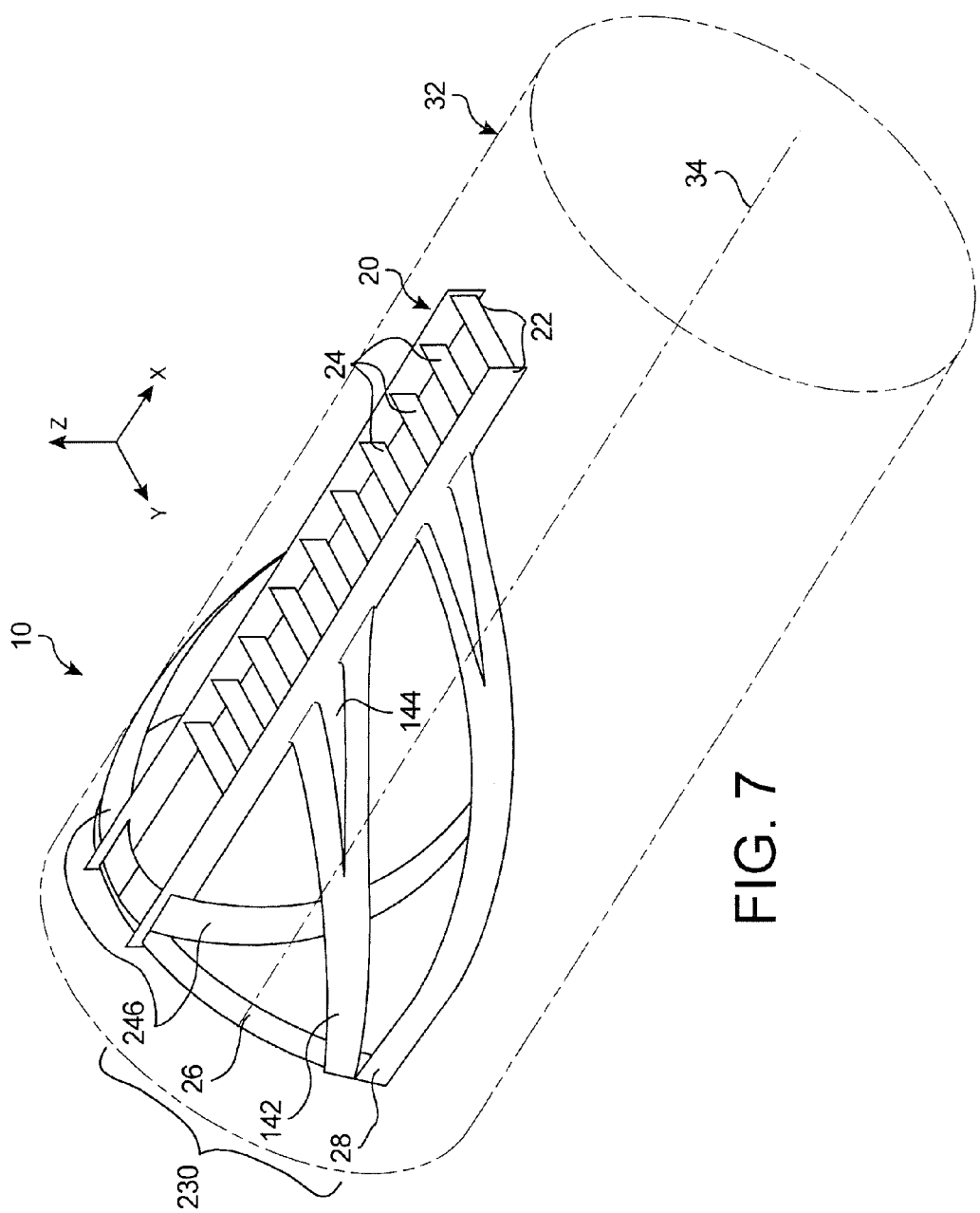
FIG. 7 shows a view similar to that shown in FIG. 3, in which the mounting pylon is in the form of a second alternative to the preferred embodiment.

FIGS. 6 and 7 show first and second variant embodiments respectively of the rigid structure 10 described above with reference to FIG. 3. Thus, in all the Figures, elements marked with the same numeric references refer to identical or similar elements.

Firstly with reference to FIG. 6 showing the first variant embodiment, note that if the plurality of arcs 130 was modified from the plurality of arcs 30 described above, it is still made so as to delimit an approximately cylindrical part of the fictitious surface 32 with a circular section, and preferably form a part of an approximately cylindrical envelope/cage with a semi-circular section centered on the longitudinal axis 34.

There are two modifications made to the plurality of arcs 30, because the arc in the form of an annular portion 26 located further aft than the rigid structure 10, was deleted, and on the other hand two secondary lateral arcs resisting thrusts 142 were added, designed to perform a role similar to the role of the arcs 28.

An arc 142 is placed on each side of the central box 20, and has a forward end rigidly connected to one of the two forwardmost ends of the arc 26, for example the mechanical link produced being located immediately above the fastener between this same forward arc 26 and the arc 28. Furthermore, the secondary lateral arc resisting thrusts 142 extends in the aft direction and upwards, until its aft end is assembled on the lateral spar 22 located on the same side as this arc 142, at a central part of the box 20. Once again, a stiffener 144 could possibly be added to reinforce the mechanical link set up between the aft end of the arc 142 and the associated lateral spar 22, for example this link being made by welding or by mechanical assembly.

Furthermore, note that the secondary lateral arc resisting thrusts 142 may intersect the other two arcs in the form of an annular portion 26 without necessarily being fixed to them.

With reference to FIG. 7 showing the second alternative, note that the plurality of arcs 230 was modified from the plurality of arcs 130 described above, but that it is still made so as to delimit part of the approximately cylindrical fictitious surface 32 with a circular section, and preferably to form part of an approximatively cylindrical envelope/cage with semi-circular section, centered on the longitudinal axis 34.

There are also two modifications made for the plurality of arcs 130, because only the forward arc in the form of an annular portion 26 was kept, and that two arcs 246 were also added to support the thrust resisting arcs 28.

A support arc 246 is arranged on each side of the central box 20, and has a forward end rigidly connected to a forward part of the box 20. Furthermore, the support arc 246 extends in the aft direction and downwards, until its aft end is assembled on the thrust-resisting arc 28 located on the same side as this arc 146, in an approximatively central part 28 of this arc.

With such an arrangement, the support arcs 246 working in tension stop the thrust resisting arcs 28 from deflecting during the different flight phases of the aircraft, and therefore prevent a significant separation occurring between the two arcs 28 and 142 on one side of the rigid structure 10.

Note that on each side of the rigid structure 10, the arcs 142 and 246 as seen in a side view are approximately in an X formation. Furthermore, the support arc 246 may intersect the lateral secondary thrust-resisting arc 142 without necessarily being fixed to it.

As can be seen in FIG. 7, it is possible to fix the two forward ends of the two arcs 246 to each other, for example by welding or by mechanical assembly, between the two lateral spars 22 to which they are also connected. Naturally, it would also be possible to consider replacing the two arcs 246 by a single support arc made in a single piece and extending on each side of the central box 20, without departing from the scope of the invention.

Finally, as can be seen clearly in FIGS. 3, 6 and 7, the central box 20 of the first and second variant embodiments of the pylon 4 can also be modified by minor modifications, for example concerning the arrangement and the number of transverse ribs 24.

Figure 8A:
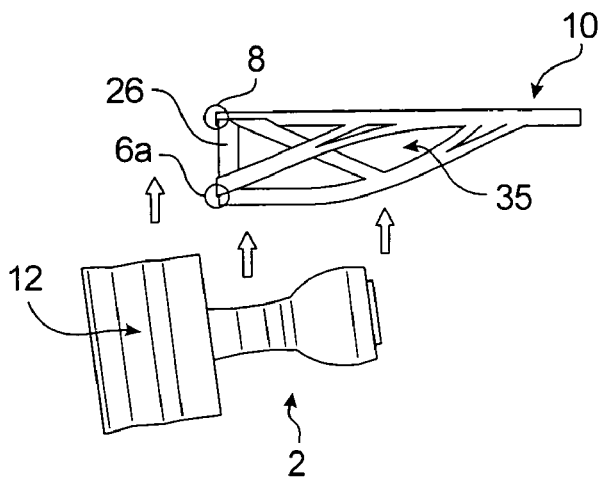
FIGS. 8a to 8c show side views illustrating different successive steps in the turbojet assembly operation onto, the mounting pylon shown in FIG. 7.
Figure 8B:
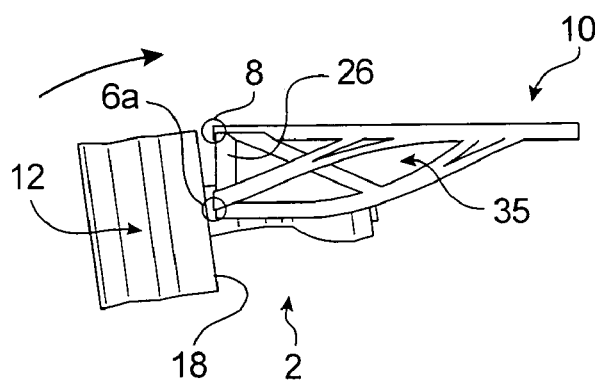
Figure 8C:
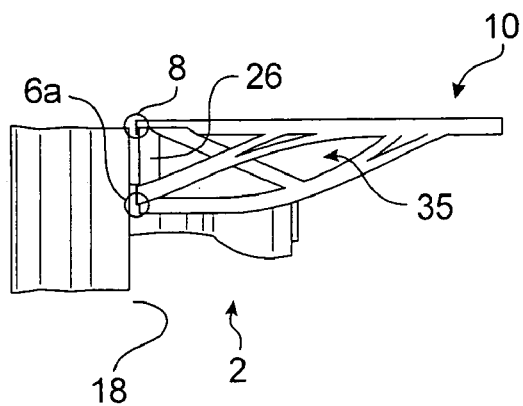

FIGS. 8a to 8c show views illustrating different successive steps of the operation to assemble the turbojet 2 onto the rigid structure 10 that has just been described, in other words in the form of the second variant embodiment.

Firstly, as illustrated by the arrows in FIG. 8a, the turbojet 2 is in a position at which its forward part is slightly inclined downwards, and is displaced upwards, for example using a conventional forklift truck (not shown) towards the rigid structure 10 that is held firmly in place.

When the turbojet 2 has been raised sufficiently to penetrate inside the space 35 defined by the fictitious surface 32 (not shown in this Figure), the fasteners 6a, 6b are placed between the ends of the forward arc 26 and the peripheral annular part 18 of the fan casing 12, respectively.

The turbojet 2 is then pivoted about the first and second fasteners 6a, 6b such that its fan casing 12 can be raised as shown diagrammatically by the arrow in FIG. 8b. FIG. 8c shows that pivoting of the turbojet 2 is stopped as soon as the peripheral annular part 18 is sufficiently close to the forward arc 26 so that the third engine fastener 8 can be put into place.

Obviously, various modifications could be made by those skilled in the art to the mounting pylon 4 of the turbojet 2 for an aircraft that has just been described, solely as a non-limitative example. In particular, for example, it is worth mentioning that although the pylon 4 has been presented in an adapted configuration for it to be suspended underneath the aircraft wing, this pylon 4 could also be presented in a different configuration so that it could be mounted above this wing.

The invention claimed is:

1. A mounting pylon for an aircraft turbojet, with a rigid structure, the rigid structure comprising a plurality of arcs arranged so as to jointly delimit a part of an approximately cylindrical envelope with an at least partly circular section, said plurality of arcs comprising several arcs, each having an annular shaped portion approximately centered on a longitudinal axis of said envelope, said several arcs with the annular shaped portion each having a first end and a second end and each being made of a single continuous material between said first and second ends;

wherein said rigid structure of the mounting pylon comprises a central box that extends parallel to the longitudinal axis of said envelope and is fixed to each arc of said several arcs with the annular shaped portion such that each of said first and second ends of each arc of said several arcs with the annular shaped portion protrudes laterally from said central box, said plurality of arcs further comprising two lateral thrust resisting arcs located one on each side of the central box, each of said two lateral arcs having a respective first end directly fixed to said central box and a respective second end fixed to one of said first or second ends of each arc of said several arcs with the annular shaped portion, on a side of the central box.

2. A mounting pylon for an aircraft set forth in claim 1, wherein said plurality of arcs further comprises two secondary lateral thrust resisting arcs located one on each side of the central box, each of said two secondary lateral arcs being fixed to at least an arc with the annular shaped portion, and to said central box.

3. A mounting pylon for an aircraft set forth in claim 1, wherein said several arcs with the annular shaped portion is a half ring.

4. A mounting pylon for an aircraft set forth in claim 1, wherein said plurality of arcs form a part of an approximately cylindrical envelope with a semi-circular section.

5. A mounting pylon for an aircraft set forth in claim 1, further comprising a plurality of engine fasteners, each of which is fixed to said plurality of arcs.

6. A mounting pylon for an aircraft set forth in claim 5, wherein said plurality of engine fasteners comprises a first engine fastener and a second engine fastener located symmetrically about a plane defined by the longitudinal axis of the envelope and a vertical direction of the pylon, and a third engine fastener through which the same plane passes.

7. A mounting pylon for an aircraft set forth in claim 6, wherein the first, second, and third engine fasteners are fixed on said several arcs with the annular shaped portion belonging to said plurality of arcs.

8. A mounting pylon for an aircraft set forth in claim 6, wherein a plane defined by the longitudinal axis of the envelope and a transverse direction of the pylon passes through the first and second engine fasteners.

9. A mounting pylon for an aircraft set forth in claim 6, wherein the first and second engine fasteners are each configured to resist forces applied along a longitudinal direction of the pylon and along the vertical direction of the pylon.

10. A mounting pylon for an aircraft set forth in claim 6, wherein the third engine fastener is configured to resist forces applied along the longitudinal direction of the pylon and along a transverse direction of the pylon.

11. An aircraft comprising at least one mounting pylon according to claim 1.

12. A mounting pylon for an aircraft set forth in claim 1, wherein each arc of said several arcs with the annular shaped portion is similar in shape and aligned about said longitudinal axis.

13. A mounting pylon for an aircraft set forth in claim 1, wherein each arc with the annular shaped portion has first and second ends protruding laterally from said box and each of said lateral arcs being fixed to a respective end of said first and second ends of each arc with the annular shaped portion.

14. A mounting pylon for an aircraft, with a rigid structure comprising a plurality of arcs arranged so as to jointly delimit a part of an approximately cylindrical envelope with an at least partly circular section, said plurality of arcs comprising one arc having an annular shaped portion approximately centered on a longitudinal axis of said envelope, said arc with the annular shaped portion having a first end and a second end and being made of a single continuous material between said first and second ends;

wherein said rigid structure of the mounting pylon comprises a central box that extends parallel to the longitudinal axis of said envelope and is fixed to said arc with the annular shaped portion such that each of said first and second ends of said arc with the annular shaped portion protrudes laterally from said central box, said plurality of arcs further comprising two lateral thrust resisting arcs located one on each side of the central box, each of said two lateral arcs having a respective first end directly fixed to said central box and a respective second end fixed to one of said first or second ends of said arc with the annular shaped portion, on a side of the central box, wherein said plurality of arcs further comprises two lateral support arcs, said two lateral support arcs being arranged one on each side of the central box and each being fixed to one of said two lateral thrust resisting arcs, and to said central box.

\* \* \* \* \*